United States Patent [19]

Hunter

[11] Patent Number: 4,589,519

[45] Date of Patent: May 20, 1986

[54] VEHICLE MOUNTED FIRE ESCAPE CHUTE

[76] Inventor: Danny P. Hunter, 17226 Eddon, Melvindale, Mich. 48122

[21] Appl. No.: 784,205

[22] Filed: Oct. 4, 1985

Related U.S. Application Data

[63] Continuation-in-part of Ser. No. 610,955, May 16, 1984.

[51] Int. Cl.[4] ..................... B64D 25/08

[52] U.S. Cl. ..................... 182/48; 182/2; 193/6; 193/16

[58] Field of Search ..................... 182/48, 49, 40, 41, 182/2; 193/6, 16, 30

[56] References Cited

U.S. PATENT DOCUMENTS

| | | | |
|---|---|---|---|
| 2,381,812 | 8/1945 | Elwood | 182/49 |
| 3,016,975 | 1/1962 | Gogol | 182/48 |
| 3,088,542 | 5/1963 | Johnson | 182/48 |
| 3,339,690 | 9/1967 | Craig | 182/48 |

FOREIGN PATENT DOCUMENTS

| | | | |
|---|---|---|---|
| 103507 | 1/1964 | Norway | 182/48 |
| 2038257 | 7/1980 | United Kingdom | 182/48 |

*Primary Examiner*—Reinaldo P. Machado
*Attorney, Agent, or Firm*—Basile, Weintraub & Hanlon

[57] ABSTRACT

A telescoping, extensible fire escape chute is mounted on a vehicle carrying a telescoping boom having a passenger basket mounted at an upper end. The fire escape chute is formed of a plurality of telescoping sections which automatically extend and retract upon extension or retraction of the telescoping boom. In one embodiment, support cables under variable tension are attached to the sides of the chute to prevent sideways tipping of the chute during use. In another embodiment, pins and wedges are used with selected chute and boom sections to securely mount the chute to the boom as the boom is extended. In yet another embodiment, a scissor-action locking bolt with extensible and retractable links is used to releasably connect selected chute sections to the boom. A deflatable cushion is mountable on the vehicle below the lower end of the chute and includes a plurality of vertically stacked inflatable members which, during deflation when a person or object strikes the cushion, gradually slow movement of the person or object in a controlled manner.

6 Claims, 11 Drawing Figures

VEHICLE MOUNTED FIRE ESCAPE CHUTE

CROSS REFERENCE TO CO-PENDING APPLICATION

The subject application is a continuation-in-part of application Ser. No. 610,955, filed on May 16, 1984 in the name of Danny P. Hunter and entitled Vehicle Mounted Fire Escape Chute.

BACKGROUND OF THE INVENTION

1. Field of the Invention

This invention relates, in general, to fire escape apparatus and, more specifically, to vehicle mounting fire escape apparatus.

2. Description of the Prior Art

Modern fire departments utilize a variety of methods and equipment to fight fires and to rescue people from burning buildings. Besides the conventional ladders and jump nets, it is common to utilize a truck mounted extensible boom carrying a passenger basket at an upper end. This device enables a fireman located within the basket to be raised several stories above the ground to either direct water onto the fire from a high vantage point or to rescue people trapped several stories above the ground.

While the extensible boom has provided versatility for fighting fires and rescuing people from burning buildings, it is not without its drawbacks. Typically, the passenger basket mounted on the end of the extensible boom is sized to hold only two people. Thus, a fire fighter in the basket can only resuce one person at a time from a burning building. In such a rescue attempt, the boom must be raised several stories above the ground and then retracted to deposit a person taken from the building safely on the ground. The boom must be extended again to rescue another person.

As can be seen, this is extremely time consuming since only one person at a time can be rescued. Thus despite the advantages provided by this type of fire fighting equipment, many people needlessly die each year in burning buildings since they cannot be safely removed from the building in time or they are afraid to jump into safety nets or use long extension ladders.

In an attempt to overcome this deficiency and enable the maximum possible number of people to be safely removed from a burning building in the shortest amount of time, fire fighting vehicles have been provided with an escape chute which can be raised several stories above the ground to provide a convenient escape path for people to the ground. This type of equipment clearly has the advantage than many people can be sliding down the chute at the same time.

Such chutes are typically mounted on a vehicle and are constructed of several interconnecting sections which, when assembled, can be raised or pivoted as desired. However, such escape chute requires a vehicle dedicated for use of the escape chute vehicle only increases congestion at the scene of a fire.

Thus, it would be desirable to provide a fire escape chute apparatus which overcomes the problems encountered previously devised apparatus for rescuing people from buring buildings. It would also be desirable to provide a fire escape chute apparatus which enables many people to be safely removed from a building in the shortest amount of time possible. Finally, it would be desirable to provide a fire escape chute apparatus which does not require a specialized fire fighting vehicle for its use.

SUMMARY OF THE INVENTION

The present invention is a vehicle mounted fire escape chute. The chute is formed of a plurality of telescoping sections which are mounted on an extensible, telescoping boom, carrying a passenger basket at an upper end. The chute is automatically extended and retracted with extension and retraction of the boom.

In one embodiment of the present invention, support means in the form of cables are attached to the sides of the chute and are placed under tension by meas of a spring motor mounted on the vehicle to prevent sideway tipping of the chute.

In another embodiment, the chute is attached to the extensible boom by means of a plurality of pins which are insertable through slots formed in the chute and boom section and secured in position to the chute and boom section by means of wedges which are driven through apertures formed in the pins after the pins have been disposed through the slot and extend below the boom to securely lock the chute on the boom.

In the third embodiment of the present invention, the chute is attached to the extensible boom by means of a plurality of locking bolts which are insertable through slots formed in the chute and boom sections. The locking bolts contain a biased, lock means mounted within each locking bolt which includes a plurality of outwardly extending legs which extend through apertures in the locking bolt and engage the bottom surface of the washer to securely mount the washer on the bottom of each boom section thereby attaching the chute to the boom section as the chute and boom sections are extended.

In operation, as the boom is extended, the chutes are attached section by section to the boom or alternating sections inserting each locking bolt through an aperture in the chute with an aligned aperture in the boom until the legs extend below the boom and outward thereby securely mounting the locking bolt and washer to the boom and attaching the chute section to the boom. Further extension and repetition of the insertion of the additional locking bolts through aligned apertures in the chute and boom sections will securely mount the entire chute to the boom. This operation may be accomplished in either the horizontal or angular orientation of the chute and boom sections.

A cushion including a plurality of separate, vertically stacked inflatable members is mounted on the vehicle at the bottom of the chute. Each of the inflatable members includes a pressure release valve which enables exhaust of air from the interior of the members upon impact of a person or object on the cushion. The pressure within each inflatable member may be varied from the uppermost member to the lowermost member to provide a gradual deceleration of people or objects sliding down the chute when they impact upon the cushion.

The unique vehicle mounted fire escape chute of the present invention overcomes many of the problems encountered with previously devised portable fire escape chutes used to rescue people from the upper stories of burning buildings. The fire escape chute of the present invention enables many people to be safely removed from the upper stories of a building at one time.

More importantly, the fire escape chute of the present invention does not require a specialized fire fighting vehicle for its use such as prior art fire escape chutes which are mounted on a vehicle dedicated solely to the transport and use of a fire escape chute. The vehicle mounted chute of the present invention, on the other hand, is mountable on a vehicle mounted extensible, telescoping boom which carries a passenger basket at an upper end and which forms a common part of today's fire department fire fighting equipment. By making the fire escape chute of the present invention mountable on a standard extensible boom, the overall costs of utilizing the chute are minimized, thereby making it affordable to many fire departments who already utilize a vehicle carrying an extensible boom.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
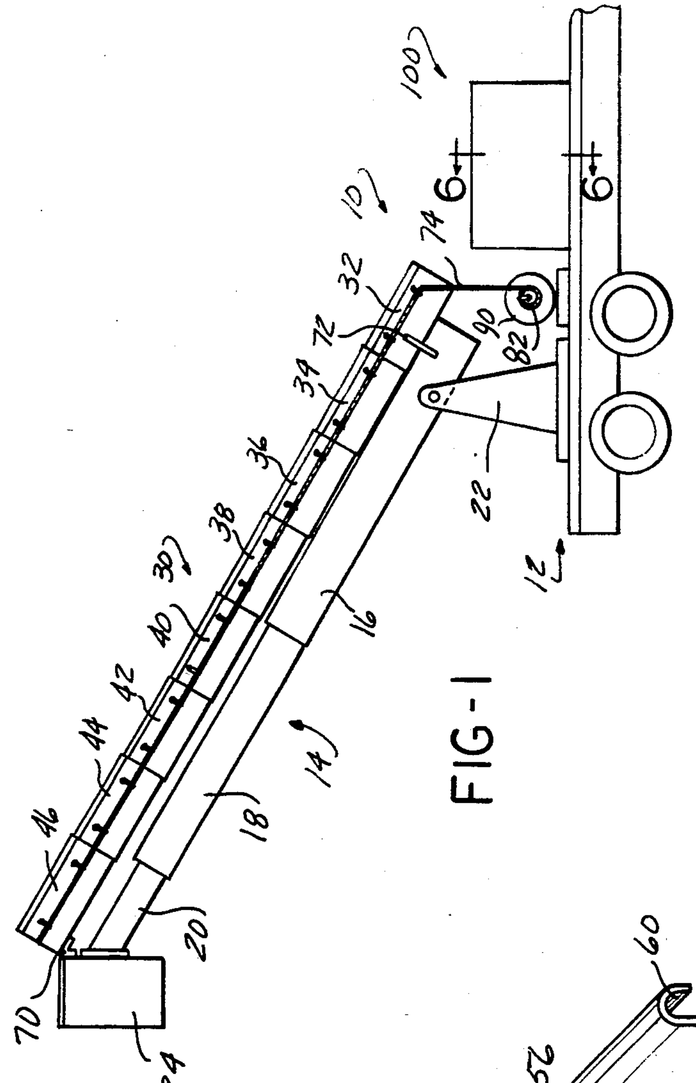
FIG. 1 is an elevational view showing the vehicle mounted fire escape chute apparatus of the present invention.

Throughout the following description and drawing, an identical reference number is used to refer to the same component shown in multiple figures of the drawing.

Referring now to the drawing, and to FIG. 1 in particular, there is illustrated a vehicle mounted fire escape chute 10 constructed in accordance with the teachings of the present invention. The fire escape chute apparatus 10 is constructed for use in rescuing people trapped in the upper stories of a burning building and enables many people to be removed from a burning building n the shortest time possible since many people can slide down the chute at the same time.

The fire escape chute apparatus 10 of the present invention includes a stndard vehicle 12, such as a truck, which carries an extensible and retractable telescoping boom 14. The boom 14 is formed of a plurality of telescoping sections, such as sections 16, 18 and 20. The lowermost section 16 is pivotally mounted on a rotatable support 22 which is carried by the vehicle 12. A passenger basket 24 is mounted on the uppermost section 20 of the boom 14 and is sized to carry one or two people. Not shown in FIG. 1 is the conventional power apparatus for extending and retracting the boom 14, raising and lowering the boom 14, as well as rotating the base support 22 to move the boom 14 to any position. As such power equipment is convention, it has been deleted from FIG. 1 for reasons of clarity.

Figure 3:
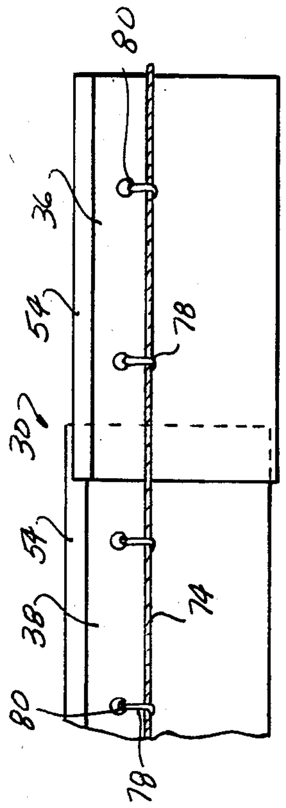
FIG. 3 is a side-elevational view of the chute sections shown in FIG. 2.
Figure 2:
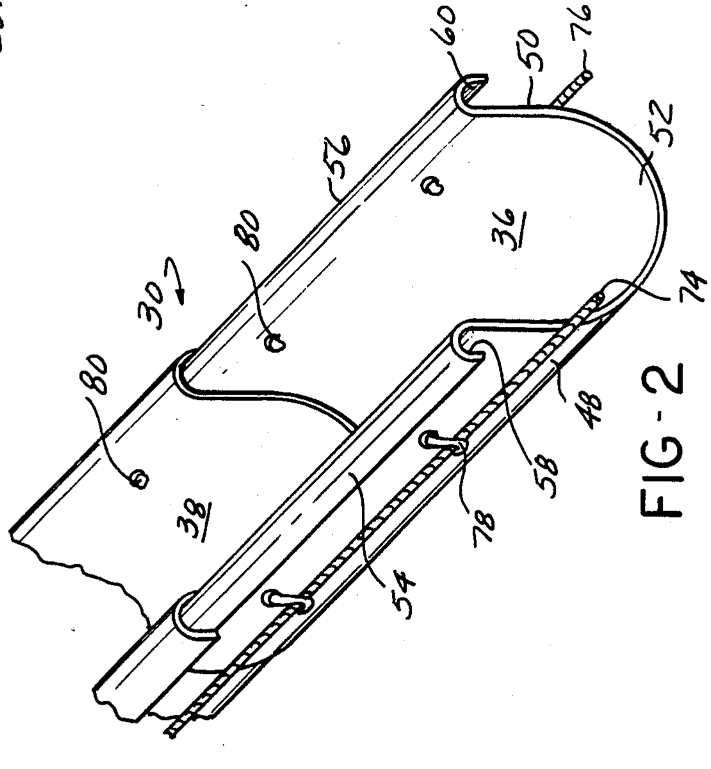
FIG. 2 is a partial, perspective view showing several telescoping chute sections.

As shown in FIG. 1 and in greater detail in FIGS. 2 and 3, an extensible and retractable, telescoping chute 30 is mounted on the telescoping boom 14. The chute 30 is formed of a plurality of U-shaped sections, such as sections 32, 34, 36, 38, 40, 42, 44 and 46. Each of the sections, such as sections 36 and 38 shown in FIGS. 2 and 3, is formed with opposed side walls 48 and 50, a bottom 52 and an open top. The upper ends 54 and 56 of side walls 48 and 50, respectively of each chute section are bent over to form inverted channels 58 and 60.

The size of each chute section as well as the overall dimensions of the inverted channels 58 and 50 formed at the upper ends of each chute section gradually increase in size from the lowermost chute section 32 to the uppermost section 46. In this manner, the channels 58 and 60 of a higher chute section, such as chute section 38, will telescoping and slidingly receive the channels 58 and 60 of the adjacent, lower chute section, such as chute section 36.

As shown in FIG. 1, the uppermost chute section 46 is connected to the passenger basket 24 by means of a mounting bracket 70. Mounting straps 72, only one of which is shown in FIG. 1, are used to attach the lowermost chute section 32 to the telescoping boom 14.

Figure 4:
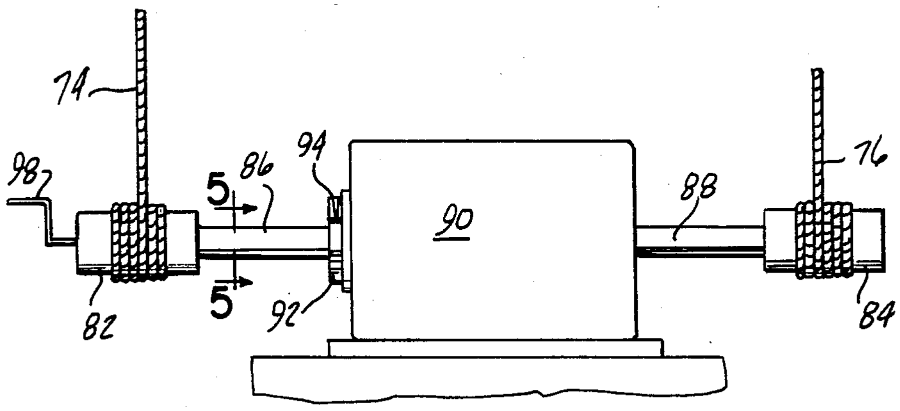
FIG. 4 is a front elevational view of the spring motor and cable tensioning means utilized in the fire escape chute of the present invention.
Figure 5:
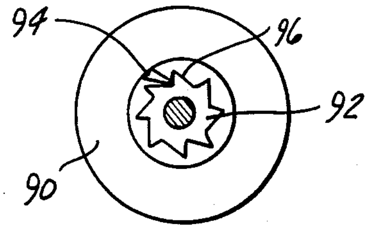
FIG. 5 is a cross sectional view generally taken along line 5—5 in FIG. 4.

Referring now to FIG. 1, 4 and 5, there is illustrated chute support means which are utilized to prevent sideways or tipping movement of the chute 30 when the chute 30 is in its extended position and people or objects are sliding down the extended chute 30. The chute support means includes cables 74 and 76 disposed on opposite sides of the chute 30. The cables 74 and 76 are attached to the chute 30 by means of a plurality of hooks 78 which are attached at one end to apertures 80 formed in each chute section and at another end to the cables 74 and 76.

The cables 74 and 76 are wound about steel drums 82 and 84 which are mounted on rotatable shafts 86 and 88 connected to a conventional spring motor 90. The spring motor 90 is mounted on the vehicle 12 and places the cables 74 and 76 under tension by applying a force acting to constantly urge the cable 74 and 76 in a direction towards the drums 82 and 84. This tension provides rigidity on opposite sides of the chute 30 which limits sideways tipping or movement of the chute 30.

Lock means in the form of a ratchet 92 and pivotal pawl 94 are mounted on the shaft 86. The ratchet 92 includes a plurality of wedge shaped teeth 96 which are engaged by the pawl 94 in one direction to prevent rotation of the shaft and yet enables the pawl 94 to pivot over each wedge section 96 when the spring motor 90 is rotated in an opposite direction. In this manner, a crank handles 98, as shown in FIG. 4, may be inserted into the end of the shaft 86 to rotate the shaft 86. This causes the pawl 94 to slide over one wedge shaped tooth 96 on the ratchet 92 and engage a succeeding wedge tooth 96. In this manner the spring motor exerts increased tension on the cables 74 and 76 and increases the support provided by the cables 74 and 76 on the sides of the chute 30.

The chute 30 may also be secured to the boom 14 in another embodiment of the present invention by means of a series of pins 120 and wedge members 122. The pins are in the form of an elongated member having an arm portion 124 and a head portion 126. An aperture 128 is formed in the bottom of the arm portion 124. THe aperture 128 is in the form of a slot which slidably receives a wedge member 122 having a wedge shape and a cross section approximate that the slot 128. The wedge member 122 is adapted to be driven into the slot 128 to secure the pin 120 within an aperture 130 formed within each of the chute sections, such as chute section 136. The aperture 130 is aligned with an aperture 131 formed in the bottom of the hollow boom section 14 to enable the pin 120 to be inserted through the aligned apertures 130 and 131. The uppermost aperture 130 is formed with an enlarged configuration to receive the head 126 in a smooth aligned position with the inner surface of the chute section, such as chute section 36. A washer 132 is initially disposed beneath the aperture 131 in the bottom surface of the boom section 16 through which the pin 120 is inserted. This provides additional support for the pin 120 when the wedge 122 is driven through the slot 128 in the pin 120.

In operation, the boom, 14 is extended, section by section in the chute 30 manually extended, section by section. The pins 130 are driven through the chute sections, which may be spaced apart by several chute sections to secure the chute 30 to the boom 14 as the boom is being extended. The reverse operation is employed to remove the chute 30 from the boom 14 as the boom 14 is being retracted. In this manner, the chute 30 is secured to the boom 14 in its extended position to enable persons or objects to be slid down the chute 30 as required during a rescue attempt.

Figure 7:
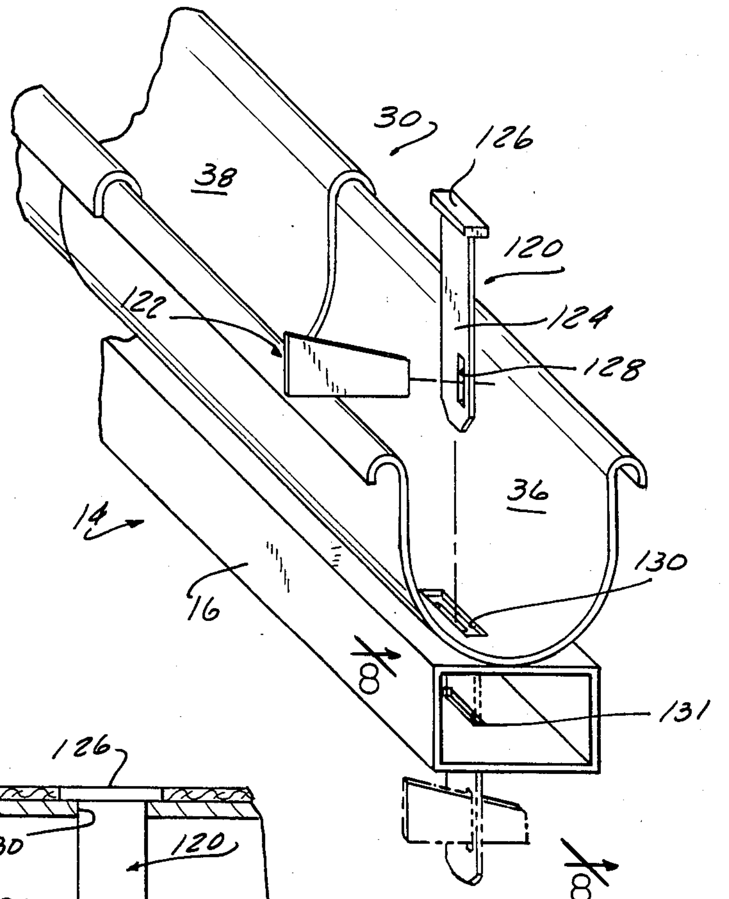
FIG. 7 is a partial, perspective view of another embodiment of the present invention.
Figure 8:
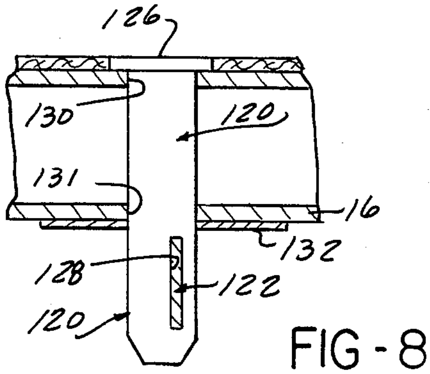
FIG. 8 is a cross sectional view generally taken along line 8—8 in FIG. 7.
Figure 9:
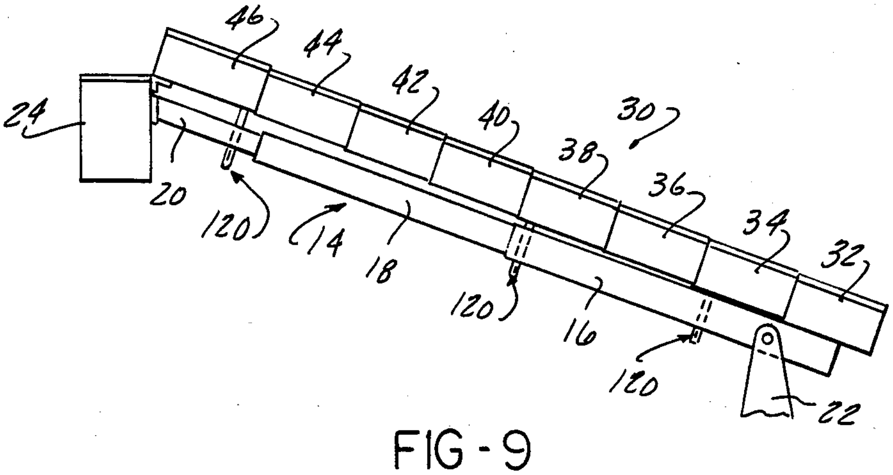
FIG. 9 is an elevational view showing another embodiment of the vehicle mounted fire escape chute apparatus of the present invention in its extended position.
Figure 10:
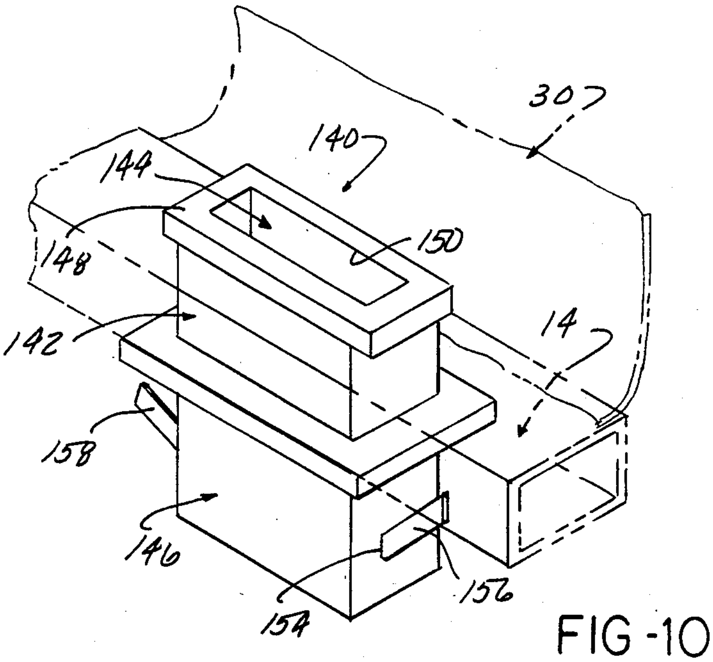
FIG. 10 is perspective view of yet another embodiment of the means for mounting the chute to the boom.
Figure 11:
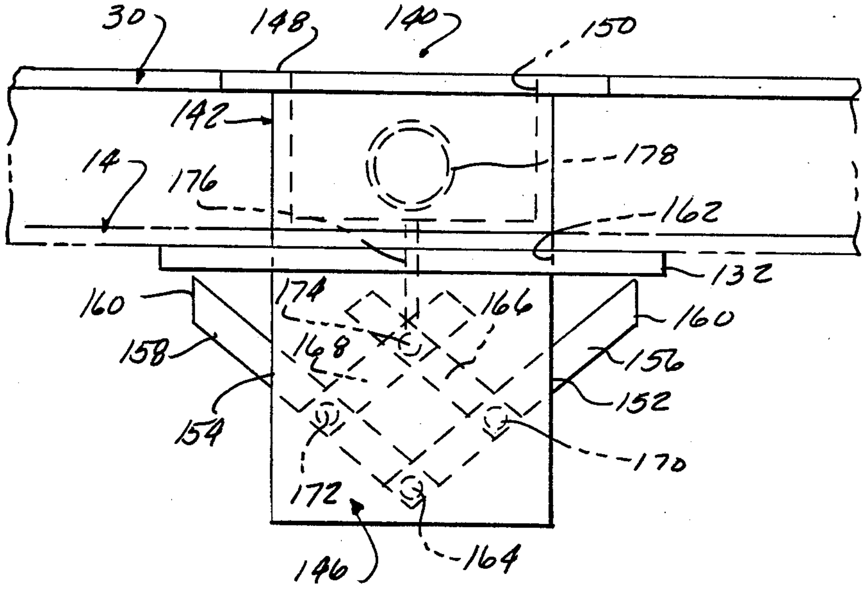
FIG. 11 is a side elevational view showing the mounting of the locking bolt shown in FIG. 10 used to lock a chute section to the boom.

In another embodiment of the present invention, an alternate means for securely mounting the chute 30 onto the extensible boom 14 is shown in FIGS. 10 and 11. In these figures of the drawing, the means for securely locking the chute to the boom includes a plurality of locking bolts, such as locking bolt 140. The locking bolt 140 comprises a housing 142 having hollow upper and lower portions 144 and 146. An outwardly extending flange is formed on the open upper end portion 144 of the locking lever 140 and surrounds a hollow interior recess 150 as shown in FIG. 10. The shape and configuration of the upper flange 148 is sized to fit securely and flush within the aperture 130 formed in certain of the sections of the chute 30 as shown in FIG. 7 and described above.

A pair of apertures 152 and 154 are formed in opposed side walls of the lower portion 146 of the locking bolt 140 through which extend outwardly extending legs or links 156 and 158, respectively. The outer ends 160 of each of the legs 156 and 158 have a truncated form which engages the washer 132 to pin the washer 132 to the bottom surface of the boom 14 thereby securely mounting the associated chute section 30 to the boom 14. The washer 132 is formed with a central aperture 162 through which the housing 142 of the locking bolt 140 extends.

The legs 156 and 158 form part of a locking means which locks the locking bolt 142 to the boom 14. The legs 156 and 158 are interconnected at one end by means of a pivot pin 164 mounted interiorally within the lower portion 146 of the locking bolt 140. Cross links 166 and 168 are interconnected to the legs 156 and 158, respectively, at intermediate portions on the legs 156 and 158 by means of pivot pins 170 and 172, respectively. The outermost ends of the cross links 166 and 168 are also interconnected at an opposite end by means of a pivot pin 174. This forms a linkage which provides a scissors-like movement of the legs 156 and 158. The cable 176 is attached to a ring or hook 178 disposed within the interior recess 150 in the upper portion 142 of the locking bolt 140.

In operation, the boom 14 is extended until one of the apertures in the boom 14 aligns with one of the apertures in the outermost chute section 30. One of the locking bolts 140 is then inserted through the aligned apertures and the washer positioned about the lower body portion 146 of the locking bolt 140. The legs 156 and 158 then spring outward by releasing the outwardly urged hook 178. This pins the washer 132 to the bottom of the boom section 14 and securely attaches the chute section to the boom 14. This operation may be repeated for successive or alternating chute sections as desired to securely mount the entire length of the chute 30 to the boom 14.

When it is desired to retract the boom and chute, the locking bolts 140 can be removed successively as the boom 14 is retracted by merely pulling upward on the hook 178 which causes an inward pivotal movement of the legs 156 and 158 into the interior of the housing 142 of the locking bolt 140 until the washer 132 is free to fall from the bottom of the boom and the locking bolt 140 can be removed from boom and chute. This frees the chute and boom for retractive movement to the fully collapsed position.

The vehicle mounted fire escape chute apparatus 10 of the present invention also includes an impact cushion 100 which is mounted on the vehicle beneath the lower end of the chute 30. The cushion 100, as shown in FIG. 1 and in greater detail in FIG. 6, includes an outer cover 102 having a hollow interior. The shape or form of the cover 102 is not critical to the use of the cushion 100 and can be provided in any convenient form such as a rectangular cross section, circular, etc.

Figure 6:
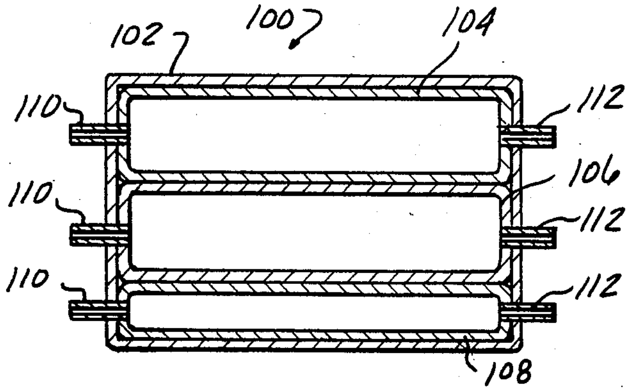
FIG. 6 is a cross sectional view generally taken along line 6—6 in FIG. 1 and showing the construction of the cushion utilized in the fire escape chute of the present invention.

A plurality of vertically stacked, inflatable members are disposed within the interior of the outer cover 102. As shown in FIG. 6, by way of example only, three inflatable members 104, 106 and 108 are disposed within the cover 102.

Each of the inflatable members 104, 106 and 108 is provided with an inlet valve 110 and an outlet pressure release valve 112. The inlet valve 110 enables each inflatable member 104, 106 and 108 to be quickly inflataed. The outlet pressure release valves 112 provide an exhaust of the air within each inflatable member 104, 106 and 108 when a person or object impacts on the cushion 100.

Due to the vertical arrangement of the inflatable members 104, 106 and 108, a person or object striking the cushion 100 is gradually decelerated in a controlled manner since the uppermost inflatable member 104 would be deflated first thereby absorbing some of the momentum of the person or object before the subsequent inflatable members will be deflated. It is also possible to provide increased pressure in the lowermost inflatable members, such as inflatable members 106 or 108 or to provide varyingly increasing pressure in the lowermost inflatable members 104, 106 and 108 to vary the deceleration rate. After the inflatable members have been deflated, they can be quickly reinflated through the inlet valves 110 for any convenient pressurized air source, such as that commonly available on the vehicle 12.

Although not shown, the fire escape chute apparatus 10 may also be provided with a conventional manually operated or powered winch positioned at the upper end of the chute 30 or in the passenger basket 24 attached to the telescoping boom 14. The winch may be used to lower people or objects down the chute 30 while they are afraid to slide down the chute 30 or who are unable to do so due to injuries.

Also, the fire escape chute 30 may be provided on the base or bottom 52 of each chute section with a roughened center portion to enable people to walk down the chute 30 instead of sliding down the chute 30. This feature can be utilized only on lower stories of the building since the greater height of upper stories would create too steep an angle on the chute 30 for persons to safely walk down the chute 30.

In summary, there has been disclosed an unique vehicle mounted fire escape chute apparatus which enables many people to be safely removed from a burning building in the shortest amount of time possible. The fire escape chute of the present invention is uniquely mounted on conventional fire fighting vehicle having an extensible and retractable telescoping boom which carries a passenger basket at an upper end. This minimizes the cost of the chute apparatus since it can be added to an existing vehicle carrying a telescoping boom and does not require a dedicated vehicle as in previously devised portable fire escape chute apparatus.

What is claimed is:

1. A fire escape chute for use on a vehicle having an extensible boom comprising:

a fire escape chute mounted on the boom, the chute including a plurality of telescoping chute sections, each of the chute sections including opposed side walls, a bottom and an open top; and means for mounting the chute sections on the boom, the mounting means comprising:

alignable apertures formed in selective chute sections and boom; and locking means removably insertable through the aligned apertures in the chute and boom for locking selective chute sections to the boom.

2. The fire escape chute of claim 1 wherein the locking means includes:

a plurality of pin and wedge means insertable through selected, spaced apertures in the chute and boom sections along the length of the extended boom.

3. The fire escape chute of claim 2 wherein:

a pin having an enlarged head portion and an elongated arm portion;

an aperture formed in the elongated arm portion for receiving the wedge.

4. The fire escape chute of claim 3 further including plate means mountable between the boom and wedge to support the wedge and boom in position on the boom.

5. The fire escape chute of claim 1 wherein the locking means comprises:

a body having a hollow interior;

the body having an upper end insertable through the aperture in selective chute sections in flush alignment with the surface of each chute section;

a lower portion of the body extending outward through the boom;

a pair of locking members extendable outward from the lower portion of the body to engage the boom in order to secure the chute section to the boom; and retractable means mounted within the body for retracting the locking members within the body for removal of the locking means from the boom and chute.

6. The fire escape chute of claim 4 wherein the locking means comprises:

first and second links pivotally connected at one end and extending outward from the lower portion of the body;

first and second cross links pivotally connected together at one end and at a second end to the first and second legs, respectively; and hook means attached to the interconnection point of the third and fourth links causing retraction of the third and fourth links as well as the first and second links to retract the first and second links into the interior of the body for removal of the body from the chute and boom sections.

* * * * *